United States Patent
Li et al.

(10) Patent No.: US 8,639,837 B2
(45) Date of Patent: Jan. 28, 2014

(54) SYSTEM AND METHOD OF TRAFFIC INSPECTION AND CLASSIFICATION FOR PURPOSES OF IMPLEMENTING SESSION ND CONTENT CONTROL

(75) Inventors: Qing Li, Cupertino, CA (US); Yusheng Huang, San Jose, CA (US); Gary Tomic, Waterloo (CA); Ronald Frederick, Mountain View, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1264 days.

(21) Appl. No.: 11/829,740

(22) Filed: Jul. 27, 2007

(65) Prior Publication Data

US 2008/0077705 A1 Mar. 27, 2008

Related U.S. Application Data

(60) Provisional application No. 60/820,784, filed on Jul. 29, 2006.

(51) Int. Cl.
*G06F 15/16* (2006.01)

(52) U.S. Cl.
USPC ............................ 709/236; 709/235; 709/237

(58) Field of Classification Search
USPC .......................................... 709/236, 235, 237
See application file for complete search history.

(56) References Cited

U.S. PATENT DOCUMENTS

| 6,567,408 B1 * | 5/2003 | Li et al. ..................... 370/395.31 |
| 7,082,133 B1 * | 7/2006 | Lor et al. ....................... 370/392 |
| 2004/0230695 A1 * | 11/2004 | Anschutz et al. ............. 709/232 |
| 2007/0061433 A1 * | 3/2007 | Reynolds et al. ............. 709/223 |
| 2007/0233877 A1 * | 10/2007 | Qu et al. ........................ 709/227 |

* cited by examiner

*Primary Examiner* — Ashok Patel
*Assistant Examiner* — Lawrence Cosby
(74) *Attorney, Agent, or Firm* — Fahmi, Sellers, Embert & Davitz

(57) ABSTRACT

Packets received at a network appliance are classified according to a packet classification rules based on flow state information maintained by the network appliance and evaluated for each packet as it is received at the appliance on the basis of OSI Level 2-Level 4 (L2-L4) information retrieved from the packet. The received packets are acted upon according to outcomes of the classification; and the flow state information is updated according to actions taken on the received packets. The updated flow state information is then made available to modules performing additional processing of one or more of the packets at OSI Layer 7 (L7).

47 Claims, 8 Drawing Sheets

SYSTEM AND METHOD OF TRAFFIC INSPECTION AND CLASSIFICATION FOR PURPOSES OF IMPLEMENTING SESSION ND CONTENT CONTROL

RELATED APPLICATIONS

The present application is a nonprovisional of, claims priority to and incorporates by reference U.S. Provisional Application No. 60/820,784, filed 29 Jul. 2006, assigned to the assignee of the present invention.

FIELD OF THE INVENTION

The present invention relates to methods and apparatus for the classification and routing of data packets within and between one or more packet switched networks.

BACKGROUND

Many application programs make use of the Internet Protocol (IP) when being accessed across local and wide area networks as well as across the Internet. While the use of IP has advantages, it also exposes these applications as well as corporate networks to certain risks. Therefore, companies must be vigilant in regulating traffic passing into and out of their corporate/enterprise networks, irrespective of origin and with due attention paid to the content, or payload, of data packets in addition to packet header information.

Traditionally, firewalls have been used to regulate enterprise traffic at the IP packet level. First-generation firewalls are essentially packet filters, which act by inspecting individual packets as they pass between different computer systems. If a packet matches one of the packet filter's rules, the packet filter takes the corresponding action prescribed by that rule. Firewall rulesets may be "inclusive" or "exclusive". An exclusive firewall allows all traffic through except for the traffic matching a rule from the ruleset. An inclusive firewall does the reverse.

Packet filters typically operate at a relatively low level of the TCP/IP protocol stack (typically OSI Layer 2 to Layer 4). The firewall administrator may define the matching criteria for the firewall along with the corresponding rules for how to treat packets upon a match. Packet filters generally do not take action according to whether individual packets are part of existing traffic flows, that is, the packet filters do not maintain any information concerning connection state. Instead, packets are filtered based only on information contained within the individual packets themselves.

Second-generation firewalls, on the other hand, are "stateful" filters, which maintain records of connections passing through the firewall. Any existing network connection can be described by several properties, including source and destination IP address, UDP or TCP ports, and the current stage of the connection's lifetime (including session initiation, handshaking, data transfer, or completion connection). Because stateful firewalls maintain context about active sessions, they can use that state information to speed up packet processing. If a packet does not match an existing connection, it will be evaluated according to the firewall's ruleset for new connections. If a packet matches an existing connection based on comparison with the firewall's state table, it will be processed in accordance with rules for that connection.

An example of a well-known firewall application is ipfw, an open source firewall software implementation. ipfw uses rules and associated coding techniques to retain information about active connections. Rule evaluation in ipfw, however, is not stateful.

The ipfw rule set is organized such that groups of ipfw rules are coded to allow or deny packets based on the values contained in those packets. When a packet enters the firewall it is compared against the first rule in the rule set and such comparisons progress one rule at a time in ascending rule number sequence order. As soon as the subject packet matches a particular rule's selection parameters, that rule's action field value is executed and the search of the rule set terminates for that packet. This is referred to as a "first match wins" search method. If the packet does not match any of the rules, it is acted on by an ipfw default rule, which allows or denies the packet according to the associated action specified by the firewall administrator.

Another form of network device used to regulate traffic in computer networks is a proxy server (often referred to simply as a proxy). Generally, a proxy is a computer system or application program that resides logically between one or more clients and one or more content sources (e.g., servers), and which terminates connections between the clients and the content sources. In response to a client request, for example for a specified service, file, connection, web page, or other resource, the proxy provides the requested content directly (e.g., if it stores a local copy of same) or connects to the specified server and makes the request on behalf of the client. In this latter case, the proxy may retain a copy of the requested content so as to service later requests for that content directly, without having to connect to the server. Transparent proxies are so termed because their presence in a network is transparent to the clients (and possibly also to the servers as well). That is, the client does not need to configure a proxy and cannot directly detect that its requests are being proxied. In contrast, explicit proxies are those which a client is aware of and/or to which a client is directed (e.g., by configurations to a browser) to make requests.

Like firewalls, proxies can filter traffic based on many packet attributes, such as source IP address and/or port, and destination IP address and/or port. In addition, proxies can filter traffic based on destination service such as hypertext transfer protocol (HTTP), file transfer protocol (FTP), etc., and on other attributes. As these devices operate at the application layer, they may inspect the contents of the traffic, blocking what a network administrator views as inappropriate content. A proxy can route traffic at the network layer if the traffic satisfies the proxy's policies. In addition, a proxy can terminate all connections, and may initiate its own connections if the connections satisfy the proxy's policies.

One benefit of using a proxy to perform filtering operations is that the proxy can "understand" certain applications and protocols (such as HTTP, FTP, etc.), and can detect whether an unwanted protocol is being transmitted on a non-standard port, or whether a protocol is being abused in a known harmful way. When performed by a second-generation firewall, this type of filtering is usually done by deep packet inspection (DPI). DPI is a form of packet filtering that examines the data part of a packet, searching for non-protocol compliance or predefined criteria (i.e., data patterns) to decide if the packet can pass. This is in contrast to shallow packet inspection, performed by first-generation firewalls, which just checks the header portion of a packet. DPI devices have the ability to look at OSI Layer 2 through Layer 7 information within a packet and identify and classify traffic based on packet signatures (i.e., known packet characteristics associated with malicious or undesired content).

Devices operating in the OSI Layer 2-Layer 4 (L2-L4) protocol stack layers offer the advantages of simplicity and high speed, but are relatively unintelligent, and are able to base the regulation of IP packets only on information available in the link-layer header, IP packet header and L-4 protocol headers (e.g., such as TCP and UDP headers). Such devices can block traffic from undesirable IP addresses, for example, but are not capable of detecting policy violations for content transmitted from a "trusted" address. Devices operating at OSI Layer 7 (L7), on the other hand, are capable of regulating IP packets based on the payload of a single packet or of a plurality of individual packets making up a particular message. Such devices provide network administrators with much more visibility into and control of network communications. However, this visibility and control comes at an increased overhead cost reflected in more expensive processing hardware and longer processing times. Given the ever expanding flow of IP-based communication traffic, this overhead is a substantial and worsening problem for many private networks. Moreover, conventional IP firewall methods of regulating traffic require the rigid application of "rules" which must be applied in a particular and inflexible order. Often, these rules are not readily amenable to modification without jeopardizing the integrity of the policies as the needs of the enterprise and the nature of the threat change.

SUMMARY OF THE INVENTION

One embodiment of the present invention provides a process in which packets received at a network appliance are acted upon according to procedures established for traffic flows with which the subject packets are associated. To accomplish this, as each packet is received it is evaluated against packet classification rules. Each of the packet classification rules has associated matching criteria and information derived from an individual packet is compared against the matching criteria defined for the packet classification rules in order to determine whether or not the action associated with the rule being evaluated should be applied to the subject packet. When an appropriate match is found (e.g., according to a most specific match process as discussed below), the packet is classified accordingly. That is, the packet is classified as belonging to the type of traffic flow associated with the matching rule, and the packet is acted upon accordingly. The packet classification rules thus act to enforce policies established by a network administrator for traffic flows within the network.

In one embodiment of the present invention, the matching criteria for the packet classification rules are evaluated using OSI Layer 2-Layer 4 (L2-L4) information retrieved from the packets, The L2-L4 information may include one or more of: a source IP address, a destination IP address, a source port, and a destination port. In addition, this L2-L4 or processing state information may include other information, such as heuristics and/or statistical measures, that can later aid in higher layer processing of the packets at the network device.

Once classified in accordance with the above-described process, the packets may be acted upon in a variety of ways. For example, some or all of the packets may be dropped, either silently or with a notification to a sender of the affected packet(s). Alternatively, or in addition, some or all of the packets may be allowed to proceed from the network appliance to their intended destination(s) (i.e., the network appliance may bypass the packets without further processing). Further, some or all of the packets may be intercepted at the network appliance for further processing at OSI Layer 7 (L7), or some or all of the packets may be forwarded to another network device (e.g., one that is identified as being associated with a subject traffic flow to which the so forwarded packets belong) for handling.

As the received packets are acted upon according to outcomes of the classification operations, flow state information regarding the traffic flows associated with those packets is updated. Where appropriate, this updated flow state information is made available to modules performing additional processing for one or more of the packets at L7.

As indicated above in some embodiments of the present invention packets received at the network appliance are classified according to a most specific match process. In this process, flow information determined from the L2-L4 information retrieved from the packet is compared with matching criteria for the packet classification rules in order to find the rule with the longest match. This process may involve treating the L2-L4 information from the packet as a whole (e.g., by concatenation of that information) and evaluating that information as a single unit against the packet classification rules' matching criteria. The results of the most specific match process may be included in the updated flow state information made available to the modules performing processing at L7 and may also be provided to one or more processing modules involved in the packet classification process for use in classifying future packets received at the network appliance.

The matching criteria for one or more of the packet classification rules may be stored in individual, per-rule databases, separate from the processing modules configured to classify the packets on the basis of the L2-L4 information retrieved from the packets. For each packet, these separate per-rule databases may then be queried to determine if the subject classification criteria are met.

In some cases, the classification of a packet as belonging (or not) to a traffic flow will depend on whether the packet is traveling from a client to a server or from a server to a client. In some cases, this flow directionality may be determined using information retrieved from the packets. In other cases, the flow state information maintained by the network device may include information sufficient to determine whether the received packets are traveling from a client to a server or from a server to a client.

If, however, while classifying a packet, that packet's directionality cannot be determined, then the network appliance may take other steps to determine whether the received packets are traveling from a client to a server (a so-called forward direction) or from a server to a client (a so-called reverse direction). For example, the network appliance may evaluate "what-if" scenarios to determine whether or not the subject packet would be intercepted for processing at L7 on the basis of that packet's processing state information. In evaluating these scenarios, the network appliance may first evaluate the packet as if it were traveling in a forward direction, and then evaluate the packet as if it were traveling in the reverse direction. For either case, if the network appliance would have classified the subject packet as one that would be subject to interception and processing at L7, then the network appliance may break the current connection with which the subject packet is associated. This allows the client to reestablish the connection so that the network appliance will be able to properly characterize the flow.

The packet classification rules used by the network appliance may be organized so that rules most likely to match a received packet's processing state information are evaluated before other rules. For example, rules associated with previously classified flows may be evaluated prior to other rules. Further, the rules may be segregated for transparent and explicit proxies, with each category having its rules organized from a most-specific listener to a least-specific listener. Within one or both of these categories, and also for the ruleset overall, there may be a default rule to be applied in the event no other rule's matching criteria are satisfied. Hence, in the evaluation of the packet classification rules as laid out in these hierarchies, classifying packets may first involve determining whether or not the packets are associated with previously classified flows and, if so, evaluating the packets according to rules associated with those previously classified flows, otherwise determining if the packets are associated with new traffic flows and establishing flow state information for the new traffic flows.

These and further embodiments and features of the present invention will be apparent from the description thereof set forth herein.

BRIEF DESCRIPTION OF THE DRAWINGS

The present invention is illustrated by way of example, and not limitation, in the figures of the accompanying drawings, in which.

DETAILED DESCRIPTION

Figure 2:
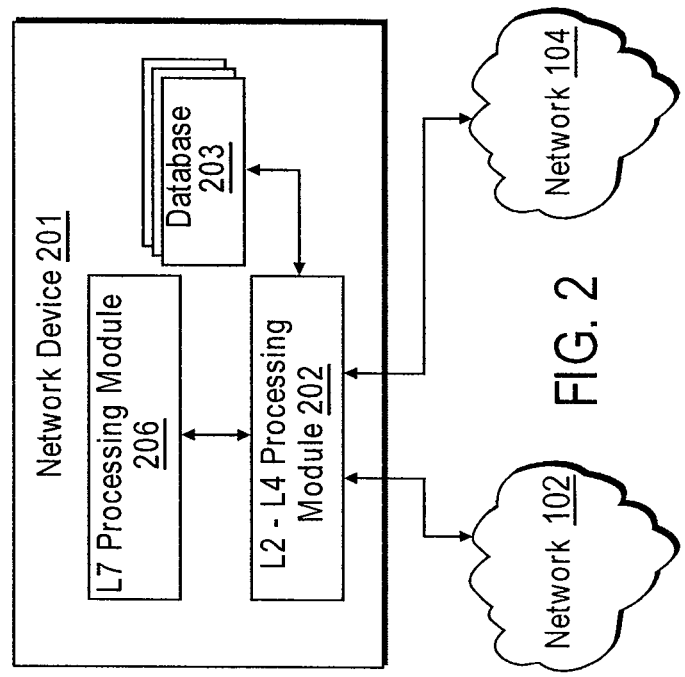
FIG. 2 illustrates in further detail a computer system configured according to one embodiment of the present invention.

Methods and apparatus for regulating the flow of data packets within or between computer (e.g., packet-switched) networks are disclosed herein. At the outset, it should be noted that firewalls are not the only devices which may be used to secure computer networks. A proxy device (running either on dedicated hardware or as software on a general-purpose computer system) may act as a firewall by responding to input packets (connection requests, for example) in the manner of an application, whilst blocking other packets. In the description below, the example of a proxy will be used as a network device in which embodiments of the present invention may be implemented. Although the present system will be discussed with reference to such examples, these examples should not be read to limit the broader spirit and scope of the present invention. For example, various apparatus presented herein, such as firewalls and proxies, may be used in the implementation of the present methods, but the present invention should not be construed as limited to these particular devices.

Based on deficiencies in conventional methods and apparatus for regulating traffic within computer networks, the present inventors have recognized there is a need for methods and apparatus capable of regulating traffic flows and applying network policies throughout the L2-L7 protocol stack, depending on criteria selectable by a network administrator. Accordingly, in one embodiment of the present invention, packets received at a network device are classified according to matching criteria for packet classification rules that are evaluated using L2-L4 information (e.g., L2-L4 packet header information) derived from the packets, with reference to state information for flows with which the subject packets are associated. This applies to both transparent and explicit sessions (i.e., the classification mechanism may be associated with a transparent proxy or an explicit proxy). As the packet classification operations proceed, the state information associated with the various traffic flows may be dynamically updated as required. The resulting classifications may cause the network device to take any of several actions with respect to each received packet, as discussed below.

Thus, the present invention provides a classification mechanism that operates using a set of rules evaluated at a connection level for each packet received at a network device. For convenience, that device may at various times be referred to herein as an appliance, however, the invention is not limited to such instantiations. The methods and systems described herein may be deployed on any network device (including in some cases client and/or server devices) at which it is convenient or useful to perform the inspection and classification operations described below.

This ability to operate across multiple OSI layers with retained state information is important. As discussed above, many conventional traffic management appliances (e.g., firewalls, switches, etc.) perform actions based solely on information available at L2-L4, and are incapable of invoking further processing at higher layers. Consequently, these devices are generally very limited in the types of packets they can classify and the types of actions they can perform. Moreover, while conventional transparent proxies are able to perform a rich set of possible actions on network traffic, they are generally very limited in their ability to select which traffic to intercept and process at L7. This often results in such devices processing much more traffic than is necessary (adding to network latencies), or in missing some traffic that should have been so processed (leaving networks vulnerable to attacks).

The present solution, on the other hand, provides a rich set of L2-L4 classification abilities, while avoiding the more costly L7 processing costs incurred by most transparent proxies. To this end, the present invention provides the ability to use rich sets of L2-L4 classification rules to intelligently select which set of traffic to further process at L7, and to carry the classification information computed during the L2-L4 classification with the flow so it is available during the L7 processing. This allows systems configured in accordance with the present invention to apply L7 processing only when it adds value, and avoids the need to repeat the classification activities that were already undertaken at L2-L4. This distinguishes the present invention even from appliances that offer L7 processing inasmuch as those devices typically must repeat lower layer processing tasks when the packets are handed off to higher layer services.

By way of example, the use of flow state information allows for sophisticated processing of packets even where no L7 process takes place. For example, in one embodiment of the present invention, sets of packet classification rules having associated matching criteria for L2-L4 packet information and traffic flow state information stored at a first network device may be used to classify packets associated with traffic flows received at the first network device. As a result of these classifications based on the L2-L4 packet information and the traffic flow state information, one or more of the packets so classified may be forwarded to a second network device identified as handling the traffic flow to which those forwarded packets belong, all without further processing the forwarded packets at the first network device at higher OSI layers. Likewise, one or more of the packets may be bypassed from the first network device to a client, even though the packets so bypassed are associated with a traffic flows identified as being handled by the second network device, and even though no further processing of the packets so bypassed takes place at higher OSI layers at the first network device.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Figure 1:
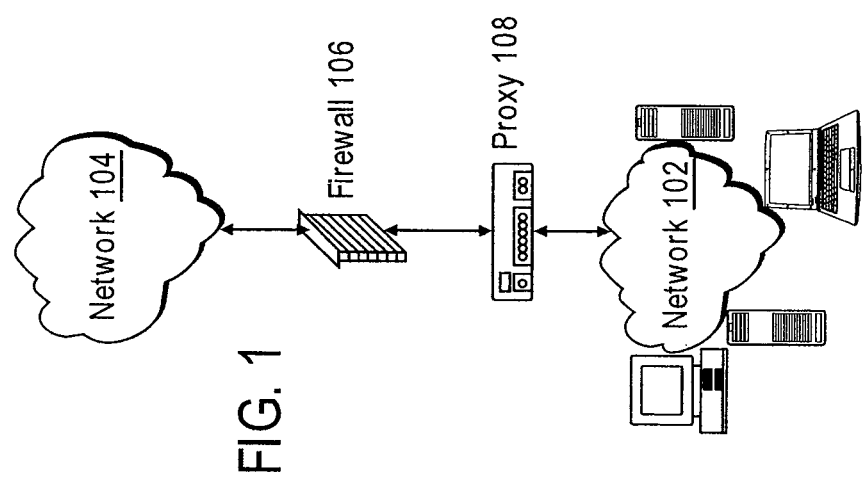
FIG. 1 illustrates a proxy server situated between the Internet and a private network on which embodiments of the present invention may be implemented.

An environment in which various embodiments of the present invention can be implemented is now described with reference to FIG. 1. FIG. 1 shows one configuration by which one network (e.g., an internal or enterprise network) 102 can be connected to another network (e.g., another segment of network 102, another local area network, or wide area network such as the Internet, etc.) 104. Network 102 can represent a private network—such as a corporate network—of any size or complexity and may include servers, routers, switches, hubs, wireless access points, printers, faxes, or any other kind of network device. Network 102 can be a sub-network, or the entire network of an enterprise.

One security tool that can be implemented between network 104 and network 102 is a firewall 106. The firewall 106 allows or blocks traffic into and out of network 102. Firewalls are widely used to give users secure access to the Internet as well as to separate a company's public Web server from its internal network. A firewall can be a stand-alone computer-based device, or may be implemented as a set of computer-readable instructions (software) to be executed by a computer-based device (e.g., a router or server) configured to perform other operations. It can be as simple as a single router that filters out unwanted packets, or it may comprise a combination of routers and servers each performing some type of firewall processing.

Another layer of security positioned between network 102 and network 104 is proxy 108. Proxy 108 can be used for address translation, caching, and other gateway functions. In one embodiment, the firewall 106 is implemented using the proxy server 108. As alluded to above, embodiments of the present invention may be implemented in the proxy server 108 and/or firewall 106, another network element such as a router or a bridge, or even on individual personal computers or workstations connected to network 102.

Referring now to FIG. 2, a network device 201 is interposed between network 104 and network 102. Network device 201 is preferably, but not necessarily, incorporated within proxy server 108. For each packet that arrives at network device 201, the packet is classified according to policies embodied as rule sets and acted upon accordingly. The classification rules operate initially on information available at the L2-L4 level. Based on the classification, any of a variety of actions may be taken, including but not limited to denying the packet, dropping the packet (either silently or with an error message being returned to the sender of the packet), bridging or forwarding the packet along its intended route, tagging and intercepting the packet for higher layer processing (e.g., L7 processing) at network device 201, or forwarding the packet to another network device where the decision as to what action to take will be made. In this latter case, the forwarding may be made on the basis of the L2-L4 information without the need for higher layer processing at the network device which initially received the packet.

For packets that are intercepted for further processing at L7, the classification information computed during the L2-L4 classification processing is carried with the packet and made available to the higher layer modules responsible for the L7 processing. Thus, the L2-L4 classification need not be repeated during the L7 processing inasmuch as that information is passed along with the packet. Stated differently, classification state is provided to higher layer processing modules on a packet-by-packet basis. This reduces overall packet processing time at the higher processing layer.

The packet classification decisions may be based on a most specific match classification process. To understand this process consider the following: Network device 201 will be configured by a network administrator with certain "listeners", i.e., a mapping from a specific IP address or subnet and port range to a service that performs the L7 processing for such traffic. Each listener will have its associated matching criteria. So, as packets arrive at network device 201, a table lookup is made to find that listener (i.e., the associated matching criteria) that has the most specific match for the connection criteria of the subject packet. Rather than simply returning a "first match" for a listener, as would be the case for a conventional firewall, this most specific match process may involve evaluating several matching listeners until the one having the longest match against the packet's connection criteria (evaluated as a whole) is located.

Importantly, the present invention provides the ability for network administrators to create these listeners using less than complete traffic flow configuration information. That is, unlike conventional listeners, which must be established based on very specific traffic flow configuration information, such as a specific IP address, port number and protocol, all of which are required to be specified, the present invention allows for the creation of listeners using less than complete traffic flow configuration information (e.g., IP address ranges or IP address prefixes or port ranges, along with a specified protocol).

These "named listeners" allowed for by the present invention provide a great degree of flexibility for the network administrator to describe and express the nature of traffic flows that are subject to policies enforced by the proxy. For example, listeners for "all HTTP traffic" or "all FTP traffic" can now be easily established. These named listeners can also be provided with matching criteria evaluated according to the most specific match process outlined above.

While most specific match algorithms have been used in the past for routers operating at L3, the present invention adds the ability to use the outcome of the most specific match process executed at L2-L4 and pass this information along to higher layers. Further, while conventional most specific match algorithms operate on L3 addresses (IP addresses), the present invention applies the most specific match algorithms to the combination of L3 information (IP addresses) and L4 information (e.g., TCP or UDP protocol, TCP or UDP ports, etc.), which is evaluated collectively as a single entity for matching purposes. Thus, the present invention provides the unique ability to operate all the way up to L7 in accordance with such a decision-making process. This also allows for the use of very fast, nonlinear table lookups that can scale with little processing overhead.

In addition to basing classification decisions on most specific matches, the present invention provides for flow state-based classification. That is, classification decisions may be based on an understanding of true client-server directionality of a session. To appreciate the advantages of this aspect of the present invention, consider that conventional network devices classify packets on the basis of source and destination addresses and ports. However, the source/destination designations within individual packets do not necessarily provide a true indication of whether packet is coming from a client and going to a server or whether it is coming from a server and going to a client. In the latter case, the server's address will be the source address and the client's address the destination address.

The present invention, however, is concerned with making classification decisions at the connection level, not simply the individual packet level (at least for some communication protocols which permit such decision making). To make these connection-level decisions, the network device must be configured to determine which direction a subject packet undergoing inspection is actually heading (i.e., client-to-server or server-to-client). The decision about what to do with a packet may depend on its directionality. For example, network administrators may decide to permit any packets outbound from network 102 to proceed with little or no inspection (reasoning that since the packet is outbound from the protected network, it cannot harm the network). Inbound packets from network 104, however, may be subjected to much stricter scrutiny inasmuch as such packets represent potential harmful or undesired content.

The present invention provides for determining an individual packet's direction based on state information associated with the flow with which the subject packet is associated. The state information is generated and stored when the initial packets of a connection are received and processed at network device 201. In particular, network device 201 is configured to recognize TCP SYN packets, which indicate the start of a connection (more specifically a request for a connection).

SYN packets are generated by clients seeking connections to servers. So, when the network device 201 recognizes a SYN packet (based on a SYN flag being set in the packet's header), the network device 201 can store the packet's associated L2-L4 information (such as source address/port, destination address/port, protocol, etc.) along with an indication that the packet is traveling in a forward, or client-to-server, direction and retain that state information for use in classifying later packets of the same flow. Likewise, the network device 201 can store L2-L4 information associated with the server's return SYN-ACK packet and use that state information for classifying later packets of the same flow traveling in the reverse, or server-to-client, direction.

Of course, not all communication protocols have this sort of directionality associated with their connections. UDP, for example, is a well-known "connectionless" protocol. Nevertheless, UDP (and similar connectionless protocols) still has a concept of a request-response transaction between a client and server, and so the present invention can still identify UDP (and similar) flows and make classification decisions at the flow level, even if not direction-based decisions. For example, DNS request/response packets associated with UDP flows can be recognized and are indicative of traffic flow direction. Thus, as these packets are observed at the network device, state information obtained as a result of such observations may be retained and used when evaluating later packets received at the network device.

There may be other times, even when dealing with TCP connections, that the network device 201 cannot determine the direction of a particular packet of a flow. For example, if the network device 201 powers up in the middle of an existing transaction or, because of a network routing change, is inserted into the network path in the middle of an existing transaction, the network device 201 will not be able to determine directionality of packets of the existing flows. This is because the network device will not have had the opportunity to observe the SYN or SYN-ACK packets of those flows.

In such cases, when the network device receives a packet of an existing flow it will be forced to determine what action it would have taken had it known the directionality of that packet. Most importantly, the network device 201 needs to determine whether it would have intercepted the subject packet because, if so, it will need to break the existing connection and force the client to reestablish communication with the server so that the network device can begin managing that connection. To allow for this determination, the present invention provides for "what if" scenarios that allow the network device to determine whether or not to break existing connections and force clients to reestablish same.

In one example, the "what if" scenarios make use of the listener services discussed above. For an arriving packet of an existing flow, the network device assumes the packet is traveling in the forward direction and checks to see if the network administrator has established a listener that corresponds to the L2-L4 information if the packet were interpreted as such. If a corresponding listener exists for such a packet, this indicates that the packet (more specifically the associated flow) is likely one that should have been intercepted. The network device also performs this analysis assuming the packet is traveling in the reverse direction. Again, if a corresponding listener exists, this is an indication that the associated flow is one that should be intercepted. This decision making process can be regarded as a matrix operation, such that if in either instance the decision would have been to intercept the packet, the network device will break the existing connection, forcing the client to reestablish it by sending a new SYN packet. This gives the network device the opportunity to receive and classify the new SYN packet and associate directionality with this new flow.

On the other hand, if the network device determines that under no circumstances would it have intercepted the subject packet involved in the "what if" decision making process, the network device will allow the flow to proceed uninterrupted. Likewise, if the network device determines that it would have allowed the packet under both forward direction and reverse direction scenarios, then it will allow packets of that flow. Of course, many other what if scenarios can be played out and rules designated accordingly and the above example is not intended as a limiting case for such evaluations.

Returning to FIG. 2, network device 201 includes one or more L2-L4 processing modules 202 and one or more L7 processing modules 206. For simplicity, the remainder of the discussion will assume only one each of such modules is present, however, the invention is not so limited. For example, network device 201 may include several L7 processing modules, one each for different application level services accommodated by the device. Alternatively, a single L7 processing module 206 may accommodate multiple application level services.

Data packets, whether traveling in the forward direction (from devices associated with network 102) or the reverse direction (from devices associated with network 104), are first received in and processed by the L2-L4 process module 202, which makes classification decisions based on information available at L2-L4. Those packets which are intercepted for farther processing at L7 are then passed to L7 processing module 206.

The L2-L4 classification decisions are informed by rule sets available to the L2-L4 process module 202. As indicated above, these rule sets are designed so as to permit network device 201 to classify packets according to most specific matches (rather than simply first matches). Further the classification rule sets may be organized so that rules most likely to match are tested first, with less likely matching rules tested later. This allows for efficient execution during classification operations. Further, L2-L4 process module 202 maintains state tables for those flows previously classified so that processing decisions need not be repeated for known connections. Separate flow state tables may be maintained for traffic flows to be intercepted, traffic flows to be bypassed, etc.

The layout of the packet classification rules (i.e., the sequence in which the rules are stored and processed) may be such as to cover both transparent and explicit proxies. That is, the rules may be segregated with different sections of rules for transparent and explicit proxies. Within each section, the different rules may be organized so that rules associated with a listener having most specific matching criteria are processed first, with rules associated with listeners having less specific matching criteria being processed later (if no earlier match is found). In some cases, a particular rule section may end with a rule associated with a wildcard or default listener (i.e., one to be used in case no other listener's matching criteria are satisfied). Likewise, the overall rule set may conclude with a rule associated with a wildcard/default listener.

The classification rule sets are, of course, based on policy decisions specified by a network administrator and, for L2-L4 classifications, are coded in the L2-L4 processing module 202. As alluded to above, although not shown in this diagram there may be multiple L2-L4 processing modules, working in parallel with one another to process packets. As modifications, updates to, additions to, or deletions from the rules for these one or more processing modules by the network administrators may jeopardize well defined and scrutinized policies, the present invention provides one or more easily modifiable databases 203 per matching rule. Each per-rule database 203 stores a set of matching criteria for its associated rule. This is in marked contrast to the conventional ipfw firewall implementation, where each rule is associated with only a single matching criteria. Database(s) 203 is/are accessible by processing module(s) 202 and can be modified and replaced at runtime without compromising the integrity of the security policies (the rules and the order of execution of the rules). These databases 203 may be exposed to a network administrator via a graphical or command line interface (not shown) to allow the administrator to make changes to the rule sets used for classifying packets.

This structure allows the rule sets coded in the L2-L4 processing module(s) 202 to be very conventional in nature, while still providing an extensible framework for more sophisticated classification operations. For example, the L2-L4 process module(s) 202 may make use of the conventional, and rather inflexible, ipfw rule sets, but also have access to much richer rule sets via the matching criteria stored in database(s) 203. An outcall from the rule sets stored in the L2-L4 process module(s) 202 can be used to access the matching criteria stored in database(s) 203.

Much like database(s) 203 can be used to store additional matching criteria defining additional rule sets for processing modules(s) 202, additional rule processing modules can be used as well. Although not shown in the diagram, these additional processing modules (similar to the L2-L4 processing module(s) 202 may access the database(s) 203 to perform packet classification operations. Indeed, each such processing module can itself be a series of processing modules. Such an architecture allows for runtime installation/registration and/or deletion/deregistration of processing modules for different rules of a rule set. As each rule of the rule set is encountered during classification operations, these additional processing modules can be queried for results of their operations. The combined results (each perhaps a partial classification result) can then be used to inform an ultimate decision for classification of the subject packet. Thus, the present invention provides the ability to execute multiple rules in sequence to classify packets collaboratively, instead of the traditional one-rule classification scheme of conventional firewalls.

Importantly, network device 201 is configured to detect changes in policies, for example as matching criteria in database(s) 203 are deleted, added or modified (during runtime) and to apply the updated policy(ies) to all traffic thereafter. This includes packets for newly received traffic flows and for previously classified traffic flows (which are now subject to re-classification based on the new policy(ies)). In one embodiment, the network device 201 is configured to determine whether or not such policy changes have been implemented as each new packet is received. Thus, new policies may be applied immediately (i.e., with a next-received packet) upon coding of the changes by the network administrator. These policy changes can be tracked (and the effects logged) for later analysis.

Figure 3:
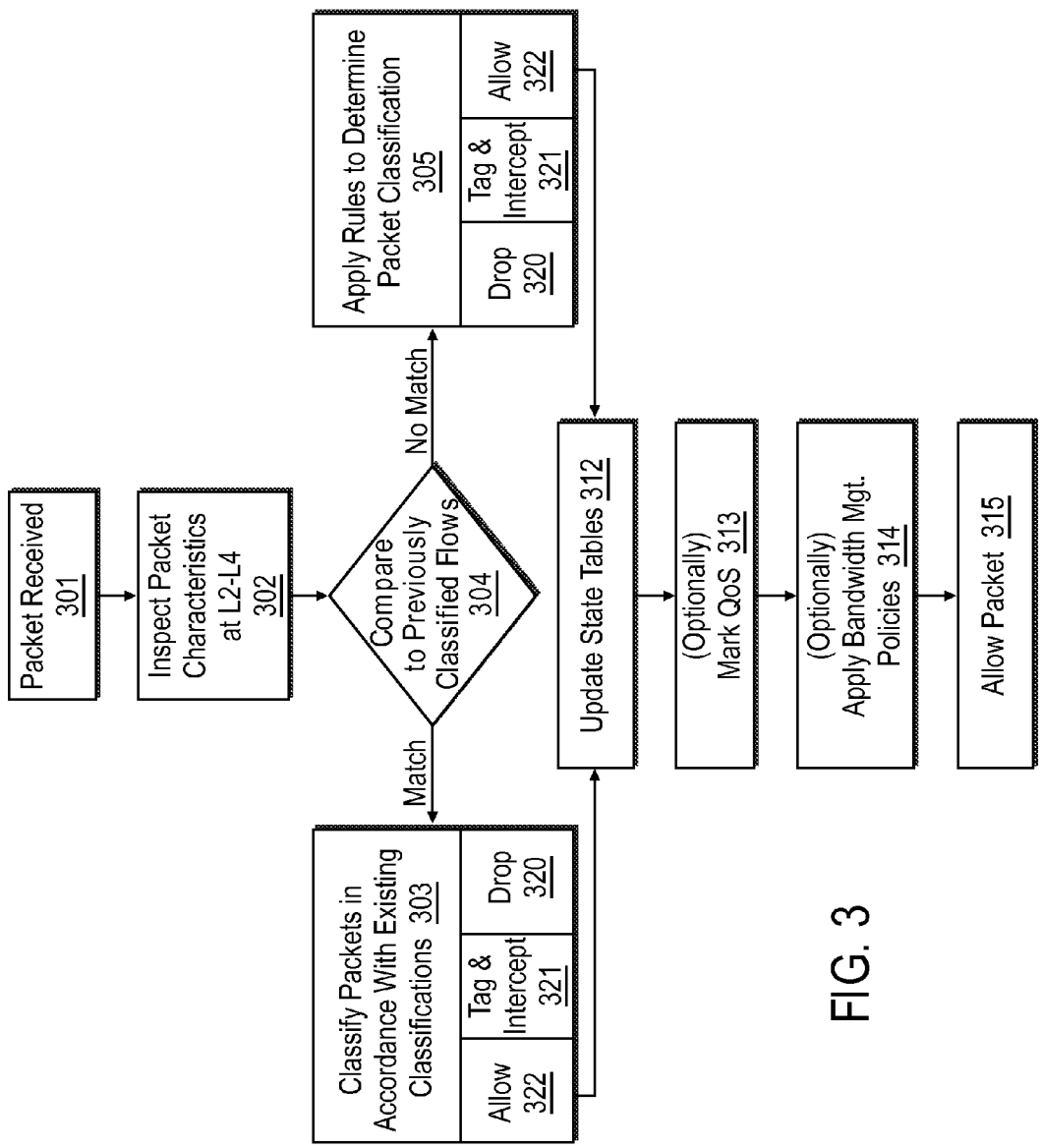
FIG. 3 illustrates an exemplary process for inspecting and classifying packets according to one embodiment of the present invention.

A process flow for one embodiment of the present invention is illustrated in FIG. 3. A packet is received for processing, 301. As discussed above, this packet may be outgoing from network 102 or incoming from network 104. Characteristics of the packet are first inspected based on information available at L2-L4, 302. These characteristics are compared, 304, to characteristics associated with packets of previously classified flows as described in state tables maintained by the L2-L4 processing module.

If there is a match between the characteristics of the data packet undergoing classification and the characteristics of an already classified flow, the subject data packet is associated with the previously classified flow, 303, and processed accordingly. This may be to drop the packet (either silently or with a notification to the sender), 320, tag and intercept the packet for processing at L7, 321, or allow the packet to proceed to its destination, 322. Of course, other actions may be taken depending on the rules applicable to the subject flow. For example, packets may be forwarded to another network device for further processing.

If the subject data packet is not associated with a previously classified flow, the packet is classified by applying the rule sets to find a most specific match for the packet, as discussed above, 305. Depending on the classification arrived at through the application of the rule sets, the packet may be dropped 320, tagged and intercepted for processing at L7, 321, or allowed to proceed to its destination 322. Of course other actions may be taken depending on the rule set for which a match was determined. For example, packets may be denied by sending a TCP reset command to the originating device. Or, packets may be forwarded to another network device for further processing.

In either of the above scenarios, if the subject packet is to be forwarded toward its destination, prior to such forwarding the associated flow state tables are updated, 312, and the packet may optionally be marked with quality of service attributes, 313, and/or a bandwidth management policy applied, 314, before the packet is forwarded, 315.

While the embodiments described above with reference to FIGS. 2 and 3 afford a general overview of the present invention, a more detailed example may assist readers in understanding some of the more subtle aspects thereof. Consider then the procedures illustrated in the flow diagrams of FIGS. 4A-4F. These processes illustrate one exemplary embodiment of the present invention. The methods described by these flow diagrams may be implemented in a proxy server (configured either as a transparent or explicit proxy), a firewall, a switch or another form of network traffic management device.

At the outset, a network administrator defines listeners for connection types of interest. The listeners in effect define the rules by which packets arriving at the appliance are to be evaluated (i.e., classified). For simplicity, the example presented in the flow diagrams is arranged so that when a packet is received at the appliance at which these processes are executed, the packet is compared against these rules one at a time. If the packet matches a particular rule, a corresponding action is executed and the process terminates for that packet. This is referred to as a "first match wins" methodology. If the packet does not match any of the rules, it may be acted upon according to a default rule.

Figure 4A:
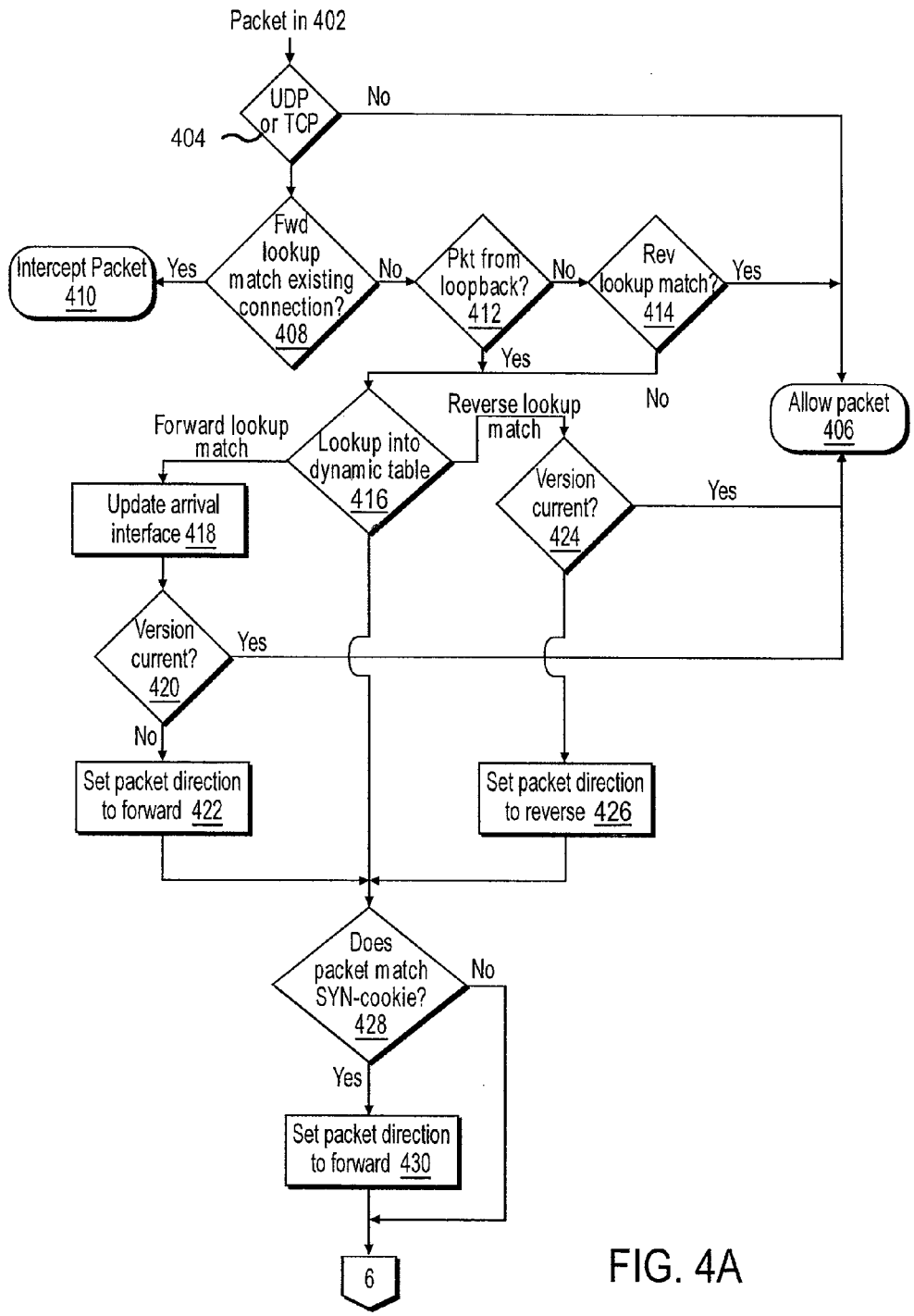
FIGS. 4A-4F are flow diagrams illustrating packet classification operations according to an embodiment of the present invention.

Referring to FIG. 4A, as a packet arrives on the subject connection (402) a determination is made as to whether the packet is associated with a TCP (transmission control protocol) or UDP (user datagram protocol) connection (404). If not, the packet is allowed to proceed on its connection path (406). Otherwise, the packet undergoes further processing as discussed below. This allows packets that are not TCP or UDP packets to be processed quickly. Of course, such a decision may not be appropriate for all circumstances and in other embodiments even non-TCP and non-UDP packets will be subjected to further processing.

If the packet is to undergo further processing, it is evaluated to determine whether or not it matches an existing connection (408). This rule makes use of the state tables referred to above and seeks to determine whether the received packet is associated with a known connection. Recall that the present invention provides the ability to make decisions based on the direction the packets are traveling between a client and a server. Thus, the evaluation needs to be made as if the packet is traveling in the forward direction and, if no matches are found, again as if the packet is traveling in the reverse direction.

In cases where the packet (evaluated for travel in the forward direction) matches an existing connection, it is intercepted (410) for processing at L7. Otherwise, the packet is examined to determine if it has arrived on a loopback interface of the appliance (412). If so, the packet is processed as described below. Otherwise, the packet is tested as if it were traveling in the reverse direction (414) to see if it matches an existing connection. If this reverse lookup results in a match, the packet is allowed to proceed to its destination (406). Of course, in other embodiments even packets traveling in the reverse direction may be intercepted for L7 processing or handled in other ways.

In the event the packet is received on a loopback interface (which check ensures traffic originated by an application running within the proxy that is destined to another application also running within the proxy can be intercepted if the packets meet the interception criteria, if any), or the packet does not match an existing connection for either the forward direction or reverse direction case, a determination is made as to whether allowing the subject packet to proceed is appropriate. This determination (416) makes use of the dynamically updated flow state information collected by the appliance to evaluate packets. Again, both forward direction and reverse direction travel is examined. For example, the determination may involve a table look-up operation based on information extracted from the subject packet to determine the applicable rule(s) to which the packet is subject. In one embodiment of the invention, the table look up is made using L2-L4 information extracted from the packet (as evaluated for forward and reverse directionality).

If the look-up process (416) results in a match (meaning that a corresponding rule for the subject packet exists), action is taken depending on whether the packet is a forward direction packet or a reverse direction packet. In the case of a forward direction packet match, the packet's arrival interface information is saved (418) and a check is made to determine if there have been any changes in service configuration (e.g., allow/intercept/drop/forward/bypass rule settings) for that interface (420). If the service configuration is current, the packet is allowed (406). Otherwise, the packet is marked as a forward direction packet (422) and further processing of the packet is required.

In the case of a reverse packet match during the look-up process (416), a check is made to determine if there have been any changes in service configuration (e.g., allow/intercept/drop/forward/bypass rule settings) for such packets (424). If the configuration is current, the packet is allowed (406). Otherwise, the packet is marked as a reverse direction packet (426) and further processing of the packet is required.

In cases where there are no forward direction or reverse direction packet matches or in cases where a match exists but service configurations for the subject packet have changed, a test is made to determine whether or not the inbound packet produces a SYN-cookie match (428). SYN-cookies were developed by Bernstein and Scheny, and are generally defined as the initial TCP sequence numbers chosen by TCP servers. These sequence numbers are selected based on specific algorithms and are used as a defense against SYN flood attacks.

If the inbound packet produces a SYN-cookie match, this implies that the packet is a TCP ACK packet sent by a client as the final step in a three-way handshake establishing a new connection. Such a packet would not have been recognized at the initial TCP packet check (404) because no connection state information would be available. In such cases, the packet direction is set to the forward direction (430) (regardless of any previous directionality setting) and the rule processing continues. If the packet does not produce a SYN-cookie match, the packet direction setting is not altered from its previous classification.

Figure 4B:
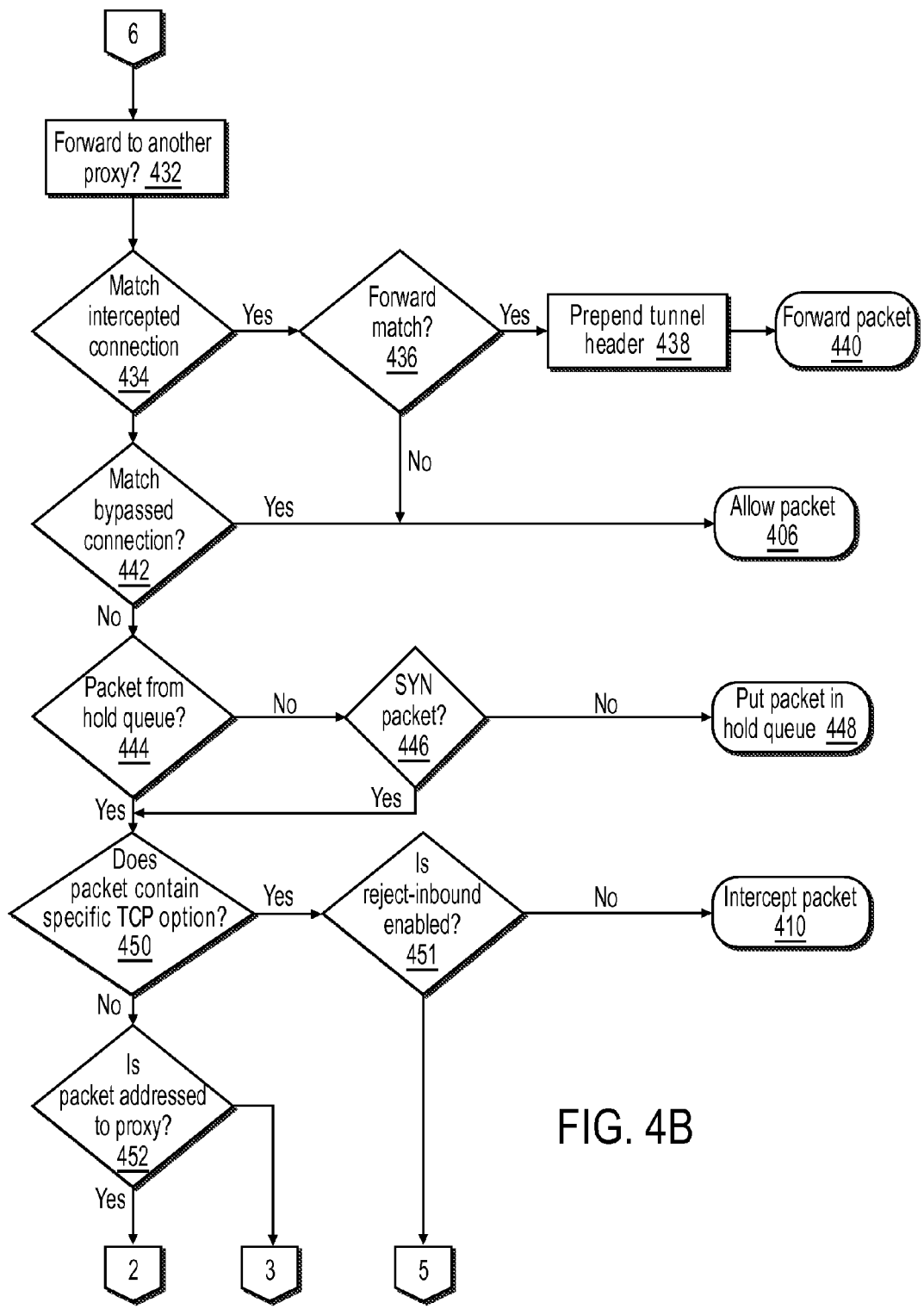

Continuing to FIG. 4B, the packet is next evaluated to determine if it should be forwarded to another appliance (432). This is useful, for example, in situations where a pair of proxies are acting as a split-proxy in an application delivery network (ADN). Briefly, as the name implies, a split proxy is a proxy implemented as two programs installed on two different computer systems. Since they are effectively two parts of the same program, they can communicate with each other very efficiently. This is ideal for compressing data over a slow link. Split proxies are sometimes used to accelerate traffic within an ADN, which may be regarded as the infrastructure and related technologies used to deliver application services across a network in an efficient manner, using a combination of caching and compression.

As part of the process of evaluating the packet to determine if it should be so forwarded, the packet is checked to see if it matches connections intercepted by the other appliance (434). If so, a check is made to see if this is a forward direction match (436), in which case the packet is forwarded to the other appliance (440). Otherwise, if the packet matches a connection intercepted by another appliance and it is not a forward direction packet, then this must be a reverse direction match, and so the packet is bypassed and allowed to proceed to its destination (406). This is because the other appliance must have already processed the subject packet. As shown in the illustration, in one embodiment of the present invention an appropriate packet forwarding header (e.g., for use in an IP-in-IP tunnel) is prepended to the packet (438) prior to the packet being forwarded (e.g., within that tunnel) to another appliance.

If the packet is not one which matches connections intercepted by the other appliance, a check is made to determine if it matches connections bypassed by that other appliance (442). If so, the packet is allowed to proceed to its destination (406).

If the packet is not to be bypassed in this fashion, it is examined to determine whether or not it originates from a hold queue at the proxy. The hold-queue may be regarded as a waiting station. Processing of newly received packets that do not match any of the proxy's existing connections is suspended for a period of time. This is desirable because the subject connection to which these newly received packets may belong might be a connection that is being handled by a peer of the subject proxy (i.e., the one that received the packet). In such a case, the current packet should be forwarded to that peer. However, because the subject proxy may not yet have received notice of such a connection from the peer device, the hold queue is used to delay processing of the packet for a period of time to allow such a communication from the peer device to be received.

This processing delay is not indefinite, however, and upon expiration of an associated timer the subject packet is retrieved from the hold queue, tagged as being therefrom, and evaluated against the processing rules as if it were the first time the packet were being so evaluated. If by this time a notice from a peer device has been received, the subject packet will be identified as belonging to a connection being handled by the peer and the packet will be handled accordingly (e.g., in accordance with steps 432, 434 and 442, discussed above). If no such notice has been received by this point, then processing of the subject packet will eventually find its way back to the processing point at which it was initially placed on the hold queue, but instead of being returned thereto the packet will be subjected to further processing without any delay.

The hold queue delay, in essence, allows for a relatively widely dispersed cluster of peer appliances. The longer the delay, the larger the coverage area (in geographic or logical hop terms) of the cluster. That is, the longer the packets are held in the hold queue, the farther the receiving proxy can be from the proxy responsible for the connection to which the subject packet belongs, because there will be sufficient time for the notice from that peer device to reach the receiving proxy. This delay time must be balanced against competing needs to process the packet before the packet sender retransmits the packet or times out the connection.

So, in one embodiment of the present invention, when the current packet is first processed and if it has not yet matched a rule as discussed above, a check is made to see if the packet is one from the hold queue (444). If the packet is not from the hold queue, a check is made to see if the packet is a SYN packet (446), and, if not, the packet is added to the hold queue (448).

In this illustrated embodiment of the present invention, SYN packets are not placed in the hold queue. The rationale is that if SYN packets were placed in the hold queue, the sender of the SYN packet may retransmit the SYN packet, possibly causing multiple connection states to be created for the same connection request. This is not critical to the present invention, however, and in other embodiments different approaches may be used.

Continuing the discussion of the flow diagram, if the subject packet is a SYN packet or it was injected from the hold queue (in which case there should be no further delay before continuing processing by execution of the next rule), the packet is checked to see if it includes a specific option flag in its header (450). If so, and if the proxy is not configured to reject inbound packets (451), the packet will be intercepted for L7 processing (410). Such a rule may be included to accommodate packets which will be specially marked by other network devices for specific handling in accordance with equipment manufacturer designs. For example, software updates to the appliance itself may include packets so marked for special processing. Otherwise, if the proxy is configured to reject inbound packets (451), the packet is processed in accordance with the procedures described below with reference to FIG. 4F.

On the other hand, if the packet does not include a specific option flag, the packet is checked (452) to determine if it is addressed to the appliance at which the processing is being performed. In this embodiment of the invention different rule sets are applied to such packets than are applied to packets that are addressed to other entities. Further processing of the packet (discussed below) is performed according to the outcome of this test.

Figure 4C:
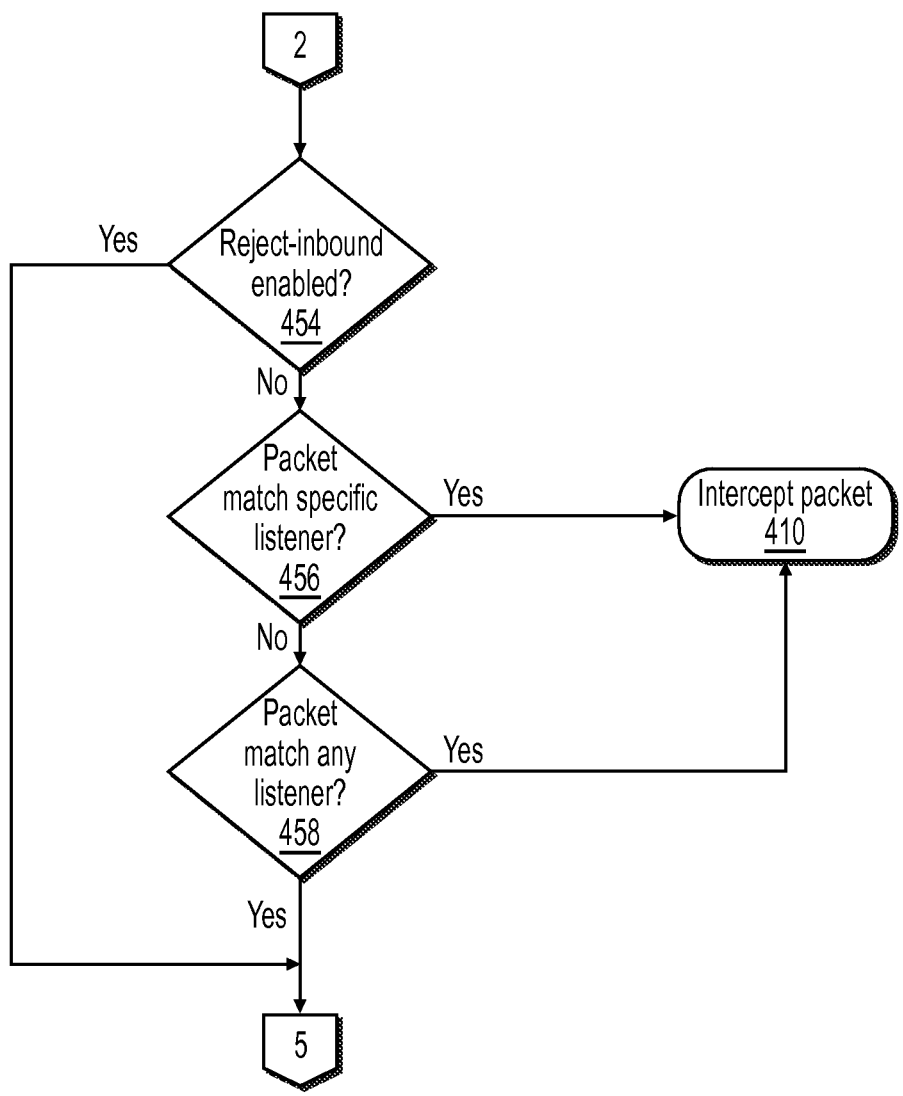

Referring now to FIG. 4C, the processing of packets that are addressed to the appliance at which the processing occurs is further illustrated. If the appliance is configured to reject inbound packets addressed to the appliance (454), these intercept routines are skipped. However, if the appliance is not configured to reject inbound packets addressed thereto, a test is made to determine whether the packet matches an application-configured IP-specific listener for which traffic is to be intercepted (456). If so, the packet is intercepted for further processing (410). Otherwise, the packet is checked to see if it matches any listeners (458). If so, it is intercepted for further processing (410). If the packet does not match any listeners or the proxy has been configured to reject inbound packets addressed thereto, the packet is subjected to further processing as discussed below in connection with FIG. 4F.

Figure 4D:
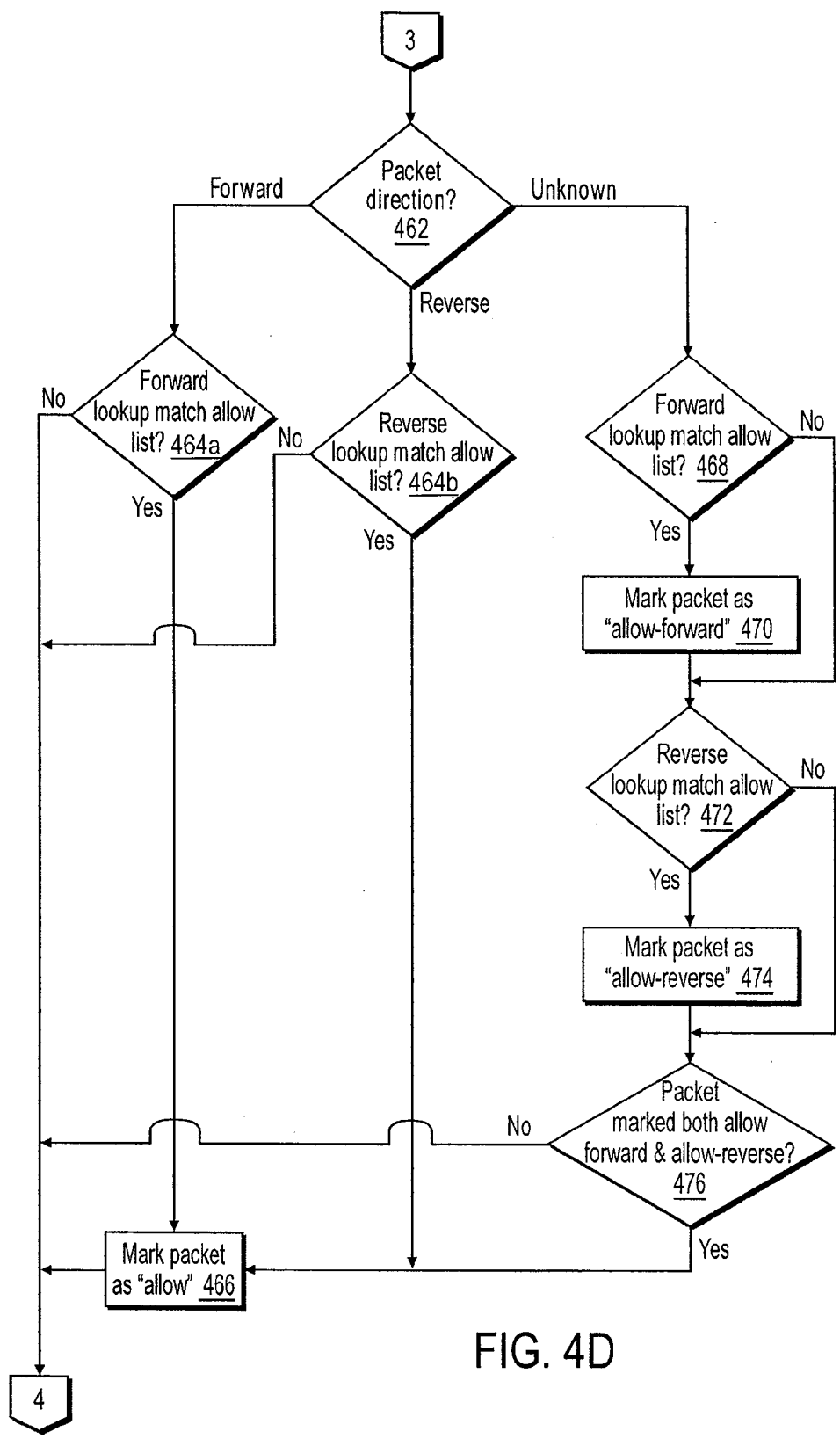

Referring now to FIG. 4D, for packets not addressed to the subject appliance at 452, processing depends on the packet direction (forward, reverse, or unknown) (462). In the case of forward direction or reverse direction packets, a test is made to determine whether the packet matches a corresponding list for packets that should be allowed to proceed to their destinations (464*a*, 464*b*). If so, the packet is marked accordingly (466) and, in any event, subjected to further processing as discussed below in connection with FIG. 4E.

For packets with unknown direction, the packet is first tested to see if a forward lookup (i.e., one that treats the packet L2-L4 information as if the packet were traveling in a forward direction) provides matches against criteria specified in the packet allow list (468). If so, the packet is marked as "allow-forward" (470). After being so marked, or if the packet does not match criteria specified in the packet allow list in the case of the forward lookup, the packet is tested to see if a reverse lookup (i.e., one that treats the packet L2-L4 information as if the packet were traveling in a reverse direction) provides matches against criteria specified in the packet allow list (472). If so, the packet is marked as "allow-reverse" (474), else it is not so marked. Finally, the packet is tested to determine whether it has been marked as both allow-forward and allow-reverse (476). If so, it is marked as allow (466), else it is not so marked. In either case, the packet is subjected to further processing as discussed below in connection with FIG. 4E.

Figure 4E:
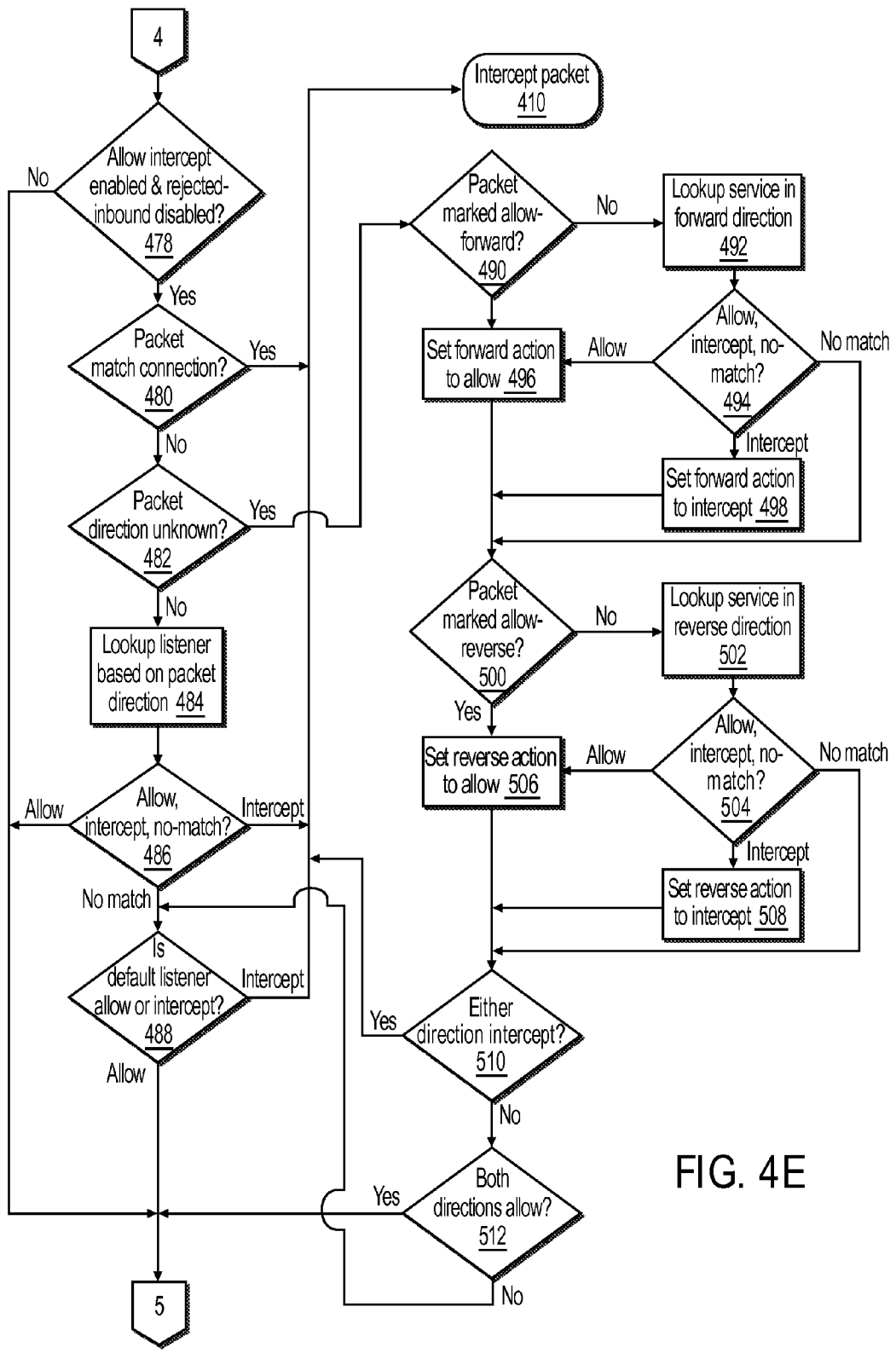

Referring now to FIG. 4E, a variety of rule-based evaluations for packets requiring such processing are illustrated. Initially, a test (478) is made to determine if the appliance is configured to perform traffic interception and/or to reject inbound packets outright. If the appliance is not configured to perform traffic interception operations and/or is configured to reject inbound packets, the packet is subjected to further processing as discussed below in connection with FIG. 4F. Otherwise one or more of the various operations illustrated in FIG. 4E are performed.

At step 480, the packet is tested to determine whether it matches a particular connection. If so, the packet is intercepted for L7 processing (410). Otherwise, a test is made to determine if the packet's direction is known (482). For packets with known direction, a look-up (484) is made (based on the packet's direction) to identify the applicable listener (and associated classification rules) for the packet and the packet is handled accordingly (486). That is, if the packet is to be intercepted, it is so intercepted (410); if it is to be allowed it is processed as discussed below in connection with FIG. 4F. If no matching rule for processing the packet is found, the packet is handled according to the appliance's default rule (488) and either intercepted (410) or allowed and processed as discussed below in connection with FIG. 4F.

For packets that do not have a known direction (482), a test is made to determine whether the packet has been marked as allow-forward (490). If not, a lookup is made according to the forward packet procedures (492). If the result of the lookup operation (494) is to allow the packet, the forward action is set to allow (496). If the result of the lookup operation is to intercept the packet for L7 processing, the forward action is set to intercept (498). If the result of the lookup operation is that no match is found, no forward action is set. If, on the other hand, the packet was marked as allow-forward (490), the forward action is set to allow (496) and processing continues.

Thereafter, a test is made to determine whether the packet has been marked as allow-reverse (500). If not, a lookup is made according to the reverse packet procedures (502). If the result of the lookup operation (504) is to allow the packet, the reverse action is set to allow (506). If the result of the lookup operation is to intercept the packet for L7 processing, the reverse action is set to intercept (508). If the result of the lookup operation is that no match is found, no reverse action is set. If, on the other hand, the packet was marked as allow-reverse (500), the reverse action is set to allow (506) and processing continues.

If, as a result of any of the above operations, the packet has been marked for interception (510), it is so intercepted (410) for L7 processing. Likewise, if as a result of any of the above operations the packet is to be allowed (512), it is processed as discussed below in connection with FIG. 4F. Otherwise, the appliance's default rule for handling packets (488) is applied and the packet is either intercepted (410) or allowed and processed as discussed below in connection with FIG. 4F.

Figure 4F:
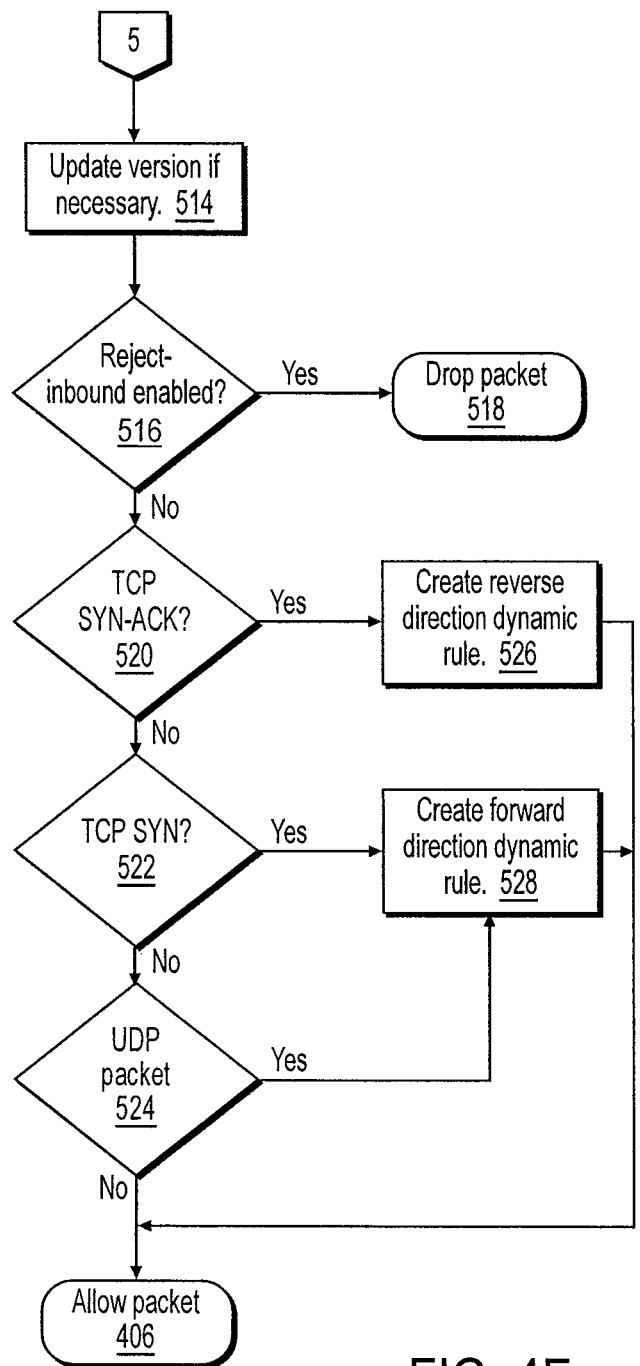

Referring now to FIG. 4F, packets that are to be allowed are processed as follows. Initially, a test (514) is made to see if the packet matches one of the dynamically maintained flow state tables stored by the appliance. If so, and if necessary, the version number of the applicable rule set is updated. Then, if the appliance is set to reject inbound packets (516), the packet is dropped (518).

If the appliance is not set to reject inbound packets, the packet is tested to determine if it is a TCP SYN-ACK packet (520), a TCP SYN packet (522) or a UDP packet (524). If none of the above, the packet is allowed (406). However, if the packet is a SYN-ACK packet, a new reverse direction rule is created so that fixture packets associated with this connection can be processed according to this new rule (526) and the packet is allowed (406). If the packet is identified as either a SYN packet or a UDP packet, a new forward direction rule is created so that future packets associated with this connection can be processed according to this new rule (528) and the packet is allowed (406). New rules such as this are added to the dynamically maintained flow state tables so that the applicable rules can be applied to fixture packets.

In general then, this embodiment of the present invention provides sequential evaluation against a set of rules for handling/classifying packets. If at a particular rule evaluation point no match is found, the evaluation proceeds to the next rule. If the subject packet matches a particular rule and should be intercepted, the process stops and the packet is intercepted for L7 processing. Finally, if the subject packet matches a particular rule and should be allowed, the evaluation proceeds to the rules for allowing packets.

Importantly, flow state information that is compiled as the packet is evaluated is retained both for later use in connection with L7 processing and for evaluating future packets. Future packet match/no-match decisions are made according to this state information. The state information is available for evaluations from one rule to the next as the classification process proceeds. Thus, even a rule that returns a no-match decision can alter the packet's current state information, which in turn can be used by the next rule to make a decision.

Thus, the present systems and methods may be used to make intercept decisions on any or all connections of an appliance. The order in which various rules are executed may be tailored to suit particular applications and the order discussed above is only intended to serve as an example of same. In some cases the rule set will be static (though the data being evaluated will be dynamic), however, in other circumstances the rule set may be dynamically modified as new rules are added, and old rules deleted or modified.

In some embodiments, packets received at a network device are classified according to sets of packet classification rules having associated matching criteria for L2-L4 (and/or other packet state) information obtained from the packets and taking action on the packets in accordance with matching ones of the packet classification rules, unless for a given interface of the network device on which one or more of the packets is received, (a) the network device is configured to reject inbound packets, in which case for inbound ones of the packets received on the given network interface, the inbound packets are dropped; (b) the network device is configured to not reject inbound packets and not allow interception of packets, in which case for those of the packets received on the given network interface, the packets are bypassed; or (c) the network device is configured to not reject inbound packets and allow interception of packets, in which case the packets are intercepted for processing at L7.

Thus methods and apparatus for the classification and routing of data packets within and between one or more packet switched networks have been described. Although discussed with reference to certain illustrated embodiments, the present invention is not intended to be limited thereto and should only be measured in terms of the claims, which follow.

What is claimed is:

1. A method, comprising
using, at a network device, sets of packet classification rules having associated matching criteria for Open Systems Interconnection (OSI) Layer 2-Layer 4 (L2-L4) packet information to select traffic flows made up of various packets received at the network device for processing at OSI Layer 7 (L7) at the network device;
carrying classification information computed at an L2-L4 processing module of the network device with those of the traffic flows so selected so that the classification information is available to an L7 processing module of the network device during the traffic flow processing at L7; and
determining, at the L7 processing module, an action to be performed on one or more of the selected traffic flows using the classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module.

2. The method of claim 1, wherein the L2-L4 packet information includes one or more of: source IP address, destination IP address, source port, and destination port.

3. The method of claim 1, wherein the packets received at the network device are classified according to a most specific match process in which traffic flow information determined from the L2-L4 information retrieved from each received packet is compared with the matching criteria of the packet classification rules in order to find a classification rule with a longest match.

4. The method of claim 1, wherein the packets received at the network device are classified with reference to state information for the traffic flows with which the received packets are associated.

5. The method of claim 4, wherein classification of the packets received at the network device includes classification against rules for a transparent proxy session and against rules for an explicit proxy session.

6. The method of claim 1, wherein as packets received at the network device are classified in accordance with the packet classification rules, state information associated with the traffic flows is dynamically updated at the network device.

7. A network device, comprising an Open Systems Interconnection (OSI) Layer 2-Layer 4 (L2-L4) processing module configured to classify packets received at the network device by evaluating L2-L4 information retrieved from said packets against sets of packet classification rules having associated matching criteria, at least some of the matching criteria being stored in per-packet classification rule databases an OSI Layer 7 (L7) processing module configured to determine an action to be performed on one or more traffic flows made up of said packets using classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module, wherein the classification information computed at an-the L2-L4 processing module of the network device is carried with the traffic flows so that the classification information is available to an-the L7 processing module of the network device during traffic flow processing at L7.

8. The network device of claim 7, wherein the L2-L4 processing module is further configured to store traffic flow state information tables, each traffic flow state information table including state information for the traffic flows made up of the packets received at the network device.

9. The network device of claim 8, wherein the traffic flow state information tables are segregated according to actions to be taken with respect to packets associated with individual ones of the traffic flows.

10. The network device of claim 7, wherein the matching criteria stored in the per-packet classification rule databases are updateable during runtime of the network device.

11. The network device of claim 7, wherein the per-packet classification rule databases are updateable during runtime of the network device.

12. A method, comprising
classifying packets received at a network device by evaluating Open Systems Interconnection (OSI) Layer 2-Layer 4 (L2-L4) information retrieved from said packets against sets of packet classification rules having associated matching criteria, the classifying being performed by one or more traffic processing modules according to matching criteria for the packet classification rules retrieved from per-packet classification rule databases separate from the network traffic processing modules;
based on said classifying, selecting traffic flows made up of various ones of the packets received at the network device for processing at OSI Layer 7 (L7) at the network device;
carrying classification information computed at an L2-L4 processing module of the network device with those of the traffic flows so selected so that the classification information is available to an L7 processing module of the network device during the traffic flow processing at L7; and
determining, at the L7 processing module, an action to be performed on one or more of the selected traffic flows using the classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module.

13. The method of claim 12, further comprising updating the matching criteria in the per-packet classification rule databases while continuing to classify the packets received at the network device.

14. The method of claim 13, wherein new packets received at the network device subsequent to the updating on the matching criteria are classified according to the updated matching criteria.

15. The method of claim 13, wherein the updating of the matching criteria is performed without modifying the packet classification rules.

16. The method of claim 12, further comprising recognizing a modification to one or more of the matching criteria and classifying new packets received at the network device in accordance with modified matching criteria immediately upon such recognition, regardless of whether or not the new packets received at the network device are associated with traffic flows previously classified by the network device.

17. The method of claim 12, wherein the packet classification rules are processed in sequence to classify the packets.

18. The method of claim 17, wherein the packet classification rules are processed in sequence to classify the packets, one or more of the packet classification rules producing partial classifications of the packets, and combining the partial classifications to arrive at final classifications for the packets.

19. The method of claim 17, wherein the packet classification rules are processed in sequence to classify the packets, the sequence proceeding from rules associated with more specific matching criteria to less specific matching criteria.

20. The method of claim 19, wherein if no prior one of the packet classification rules in the sequence produces a match for a subject one of the packets, classifying the subject one of the packets in accordance with a default classification rule for the network device.

21. The method of claim 19, wherein the packet classification rules are further segregated into transparent proxy sections and explicit proxy sections and within each section the packet classification rules are processed in a sequence proceeding from rules associated with more specific matching criteria to less specific matching criteria.

22. The method of claim 21, wherein within one or both of the segregated sections of the packet classification rules, if no prior one of the packet classification rules produces a match for a subject one of the packets, classifying the subject one of the packets in accordance with a default classification rule for the section.

23. A computer-implemented method, comprising:
classifying packets received at a network appliance according to packet classification rules based on flow state information maintained by the network appliance and evaluated for each packet as it is received at the appliance on the basis of Open Systems Interconnection (OSI) Layer 2-Layer 4 (L2-L4) information retrieved from the packet;
acting on each of the received packets according to outcomes of the classification;
updating the flow state information according to actions taken on the received packets based on the L2-L4 information;
making classification information computed at an L2-L4 processing module of the network appliance and updated flow state information which reflects said actions taken on the packets available to an OSI Layer 7 (L7) processing module of the network appliance performing additional processing of one or more of said packets at L7; and
determining, at the L7 processing module, an action to be performed on one or more of said packets using the classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module.

24. The computer-implemented method of claim 23, wherein classifying the packets results in one or more of: dropping some or all of the packets silently, dropping some or all of the packets with a notification to a sender thereof, allowing some or all of the packets to proceed from the network appliance to a destination, intercepting some or all of the packets at the network appliance for further processing at L7, and forwarding some or all of the packets to another network appliance identified as being associated with a subject connection to which those of the packets so forwarded belong.

25. The computer-implemented method of claim 23, wherein the L2-L4 information includes one or more of: source IP address, destination IP address, source port, and destination port.

26. The computer-implemented method of claim 23, wherein the packets received at the network appliance are classified according to a most specific match process in which flow information determined from the L2-L4 information retrieved from the packet is compared with information present in the packet classification rules in order to find a classification rule with a longest match.

27. The computer-implemented method of claim 26, wherein results of the most specific match process are included in the updated flow state information made available to the modules performing processing at L7.

28. The computer-implemented method of claim 23, wherein matching criteria for one or more of the packet classification rules is stored in a database separate from a processing module configured to classify the packets on the basis of the L2-L4 information retrieved from the packets, and the method further comprises evaluating said one or more rules using said matching criteria.

29. The computer-implemented method of claim 23, wherein the flow state information includes information sufficient to determine whether the received packets are traveling from a client to a server or from the server to the client.

30. The computer-implemented method of claim 29, wherein flow directionality is determined according to information derived from packets associated with TCP handshakes.

31. The computer-implemented method of claim 23, wherein the updated flow state information is further provided to a module configured to classify the packets based on the L2-L4 information for use in classifying future packets received at the network appliance.

32. The computer-implemented method of claim 23, wherein classifying the packets includes identifying individual flows to which individual ones of the packets belong.

33. The computer-implemented method of claim 23, wherein if while classifying a packet said packet's directionality cannot be determined, then evaluating whether or not said packet would be intercepted for processing at L7 by evaluating said each packet on the basis of said packet's L2-L4 information as if it reflected a first directionality and as if it reflected a second directionality, and, if in either case said packet would be classified for processing at L7, then breaking a connection associated with said packet.

34. The computer-implemented method of claim 23, wherein the packet classification rules are organized so that rules most likely to match received packet L2-L4 information are evaluated before other rules.

35. The computer-implemented method of claim 34, wherein rules associated with previously classified flows are evaluated prior to other rules.

36. The computer-implemented method of claim 23, wherein classifying packets comprises determining whether or not the packets are associated with previously classified flows and, if so, evaluating the packets according to rules associated with the previously classified flows, otherwise determining if the packets are associated with new connections and establishing flow state information for said new connections.

37. A computer-implemented method, comprising—classifying network traffic on a most specific match basis for Open Systems Interconnection (OSI) Layer 2-Layer 4 (L2-L4) information obtained from packets, said L2-L4 information being evaluated for service listeners configured for a network appliance at which the traffic is received;
   carrying classification information computed at an L2-L4 processing module of the network appliance with traffic flows comprised of said packets so that the classification information is available to an OSI Layer 7 (L7) processing module of the network appliance during processing of the traffic flows at L7; and
   determining, at the L7 processing module, an action to be performed on one or more of the traffic flows using the classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module using results of classifications so obtained when processing the network traffic at L7, wherein packet flow-state directionality is evaluated for both a forward direction flow state and a reverse direction flow state when the packet flow-state directionality cannot otherwise be determined.

38. The computer-implemented method of claim 37, wherein the most specific match basis evaluates packet L2-L4 information so as to find a listener having a smallest port range which contains a port number identified in the packet L2-L4 information.

39. The computer-implemented method of claim 38, wherein the listener having the smallest port range comprises a listener having the same port number as identified in the packet L2-L4 information.

40. The computer-implemented method of claim 37, wherein the most specific match basis evaluates OSI Layer-3 (L3) and L4 information included in the L2-L4 information as a single entity.

41. The computer-implemented method of claim 37, wherein the network traffic is further classified according to flow-state directionality.

42. The computer-implemented method of claim 41, wherein flow-state directionality is evaluated when initial packets of a connection are received and processed at the network appliance.

43. The computer-implemented method of claim 37, wherein classification decisions are informed, at least in part, by rules which define network policies, each of said rules defined by matching criteria stored in per-rule databases.

44. A method, comprising
   classifying packets received at a network device according to sets of packet classification rules having associated matching criteria for Open Systems Interconnection (OSI) Layer 2-Layer 4 (L2-L4) information obtained from the packets to select traffic flows made up of various packets received at the network device for processing at OSI Layer 7 (L7) at the network device;
   carrying classification information at an L2-L4 processing module of the network device with those of the traffic flows so selected so that the classification information is available to an L7 processing module of the network device during the traffic flow processing at L7;
   determining, at the L7 processing module, an action to be performed on one or more of the selected traffic flows using the classification information computed at the L2-L4 processing module, thereby avoiding a need to repeat, at the L7 processing module, classification activities already undertaken at the L2-L4 processing module; and
   taking the determined action on the packets of one or more of the selected traffic flows; unless for a given interface of the network device on which one or more of the packets is received, the network device is configured to reject inbound packets, in which case for inbound ones of the packets received on the given network interface, dropping said inbound packets.

45. A method, comprising;
   classifying packets received at a network device according to sets of packet classification rules having associated matching criteria for Open Systems Interconnection (OSI) Layer 2-Layer 4 (L2-L4) information obtained from the packets to select traffic flows made up of various packets received at the network device for processing at OSI Layer 7 (L7) at the network device;
   carrying classification information computed at an L2-L4 processing module of the network device with those of the traffic flows so selected so that the classification information is available to an L7 processing module of the network device during the traffic flow processing at L7;
   determining, at the L7 processing module, an action to be performed on one or more of the selected traffic flows using the classification information computed at the L2-L4 processing module, thereby avoiding a need to repeat, at the L7 processing module, classification activities already undertaken at the L2-L4 processing module; and
   taking the determined action on the packets of one or more of the selected traffic flows, unless for a given interface of the network device on which one or more of the packets is received, the network device is configured to (i) not reject inbound packets and (ii) not allow interception of packets, in which case for those of the packets received on the given network interface, bypassing said one or more packets.

46. A method, comprising:
   at a network device configured to classify packets on the basis of Open Systems Interconnection (OSI) Layer 2-Layer 4 (L2-L4) information obtained from the packets and according to sets of packet classification rules having associated matching criteria, intercepting traffic flows made up of one or more of the packets received at the network device for processing at OSI Layer 7 (L7) at the network device;

carrying classification information computed at an L2-L4 processing module of the network device with those of the traffic flows so selected so that the classification information is available to an L7 processing module of the network device during the traffic flow processing at L71 and determining, at the L7 processing module, an action to be performed on one or more of the selected traffic flows using the classification information computed at the L2-L4 processing module, thereby avoiding a need to repeat, at the L7 processing module, classification activities already undertaken at the L2-L4 processing module, provided for a given interface of the network device on which the one or more of the packets are received, the network device is configured to (i) not reject inbound packets and (ii) allow interception of packets.

47. A method, comprising classifying, at a network device, packets associated with traffic flows received at the network device according to (i) sets of packet classification rules having associated matching criteria for packet state information, and (ii) traffic flow state information stored at the network device;

carrying classification information computed at an Open Systems Interconnection (OSI) Layer 2-Layer 4 (L2-L4) processing module of the network device with those of the traffic flows so selected so that the classification information is available to an OSI Layer 7 (L7) processing module of the network device during the traffic flow processing at L7; and taking action on the packets in accordance with matching ones of the packet classification rules and according to state information associated with the traffic flows to which the packets acted upon belong, wherein (i) the packet state information includes some or all of L2-L4 information obtained from the packets, heuristics and/or statistical measures that can later aid in higher layer processing of the packets at the network device, and (ii) taking action on the packets results in one or more of: dropping some or all of the packets silently, dropping some or all of the packets with a notification to a sender thereof, allowing some or all of the packets to proceed from the network device to a destination, intercepting some or all of the packets at the network device for further processing at L7, and forwarding some or all of the packets to another network device identified as being associated with a subject connection to which those of the packets so forwarded belong, and (iii) for packets intercepted for further processing at L7;

determining, at the L7 processing module, an action to be performed on one or more of the intercepted packets using the classification information computed at the L2-L4 processing module, provided for a given interface of the network device on which the one or more of the packets are received, the network device is configured to (i) not reject inbound packets and (ii) allow interception of packets, thereby avoiding a need to repeat, at the L7 processing module, classification activities already undertaken at the L2-L4 processing module.

* * * * *